United States Patent [19]

Mueller et al.

[11] Patent Number: 5,746,111
[45] Date of Patent: May 5, 1998

[54] PISTON PUMP IN A BRAKE SYSTEM

[75] Inventors: Erwin Mueller, Renningen; Norbert Alaze, Markgroningen; Gerhard Wetzel, Korntal-Munchingen; Klaus Schmidt, Moglingen; Harald Ott, Ditzingen, all of Germany

[73] Assignee: Robert Bosch GmbH, Stuttgart, Germany

[21] Appl. No.: 765,363

[22] PCT Filed: Mar. 15, 1996

[86] PCT No.: PCT/DE96/00466

§ 371 Date: Jan. 13, 1997

§ 102(e) Date: Jan. 13, 1997

[87] PCT Pub. No.: WO96/38669

PCT Pub. Date: Dec. 5, 1996

[30] Foreign Application Priority Data

May 31, 1995 [DE] Germany ............... 195 19 833.6

[51] Int. Cl.⁶ ........................................ F16J 15/18
[52] U.S. Cl. .................. 92/168; 92/170.1; 417/454
[58] Field of Search ....................... 92/168, 170.1, 92/165 R; 417/454

[56] References Cited

U.S. PATENT DOCUMENTS

| 2,330,781 | 9/1943 | Langmyhr et al. | 92/168 |
| 3,916,771 | 11/1975 | Nendzig et al. | 92/165 R |
| 4,417,857 | 11/1983 | Sudbeck | 417/490 |
| 4,527,957 | 7/1985 | Dettinger et al. | 417/92 |
| 4,716,924 | 1/1988 | Pacht | 417/454 |
| 4,768,933 | 9/1988 | Stachowiak | 417/454 |

*Primary Examiner*—Thomas E. Denion
*Attorney, Agent, or Firm*—Edwin E. Greigg; Ronald E. Greigg

[57] ABSTRACT

This invention relates to a piston pump in a brake system having a piston, which is drivable in a reciprocating motion in a cylinder by an eccentric tang. To avert damage to a ring seal, a support ring is provided which keeps the ring seal spaced apart from a guide sheath for the piston in the cylinder by a distance that is at least as long as a stroke length of the piston. This prevents running scratches on the piston from coming into contact with the ring seal.

16 Claims, 1 Drawing Sheet

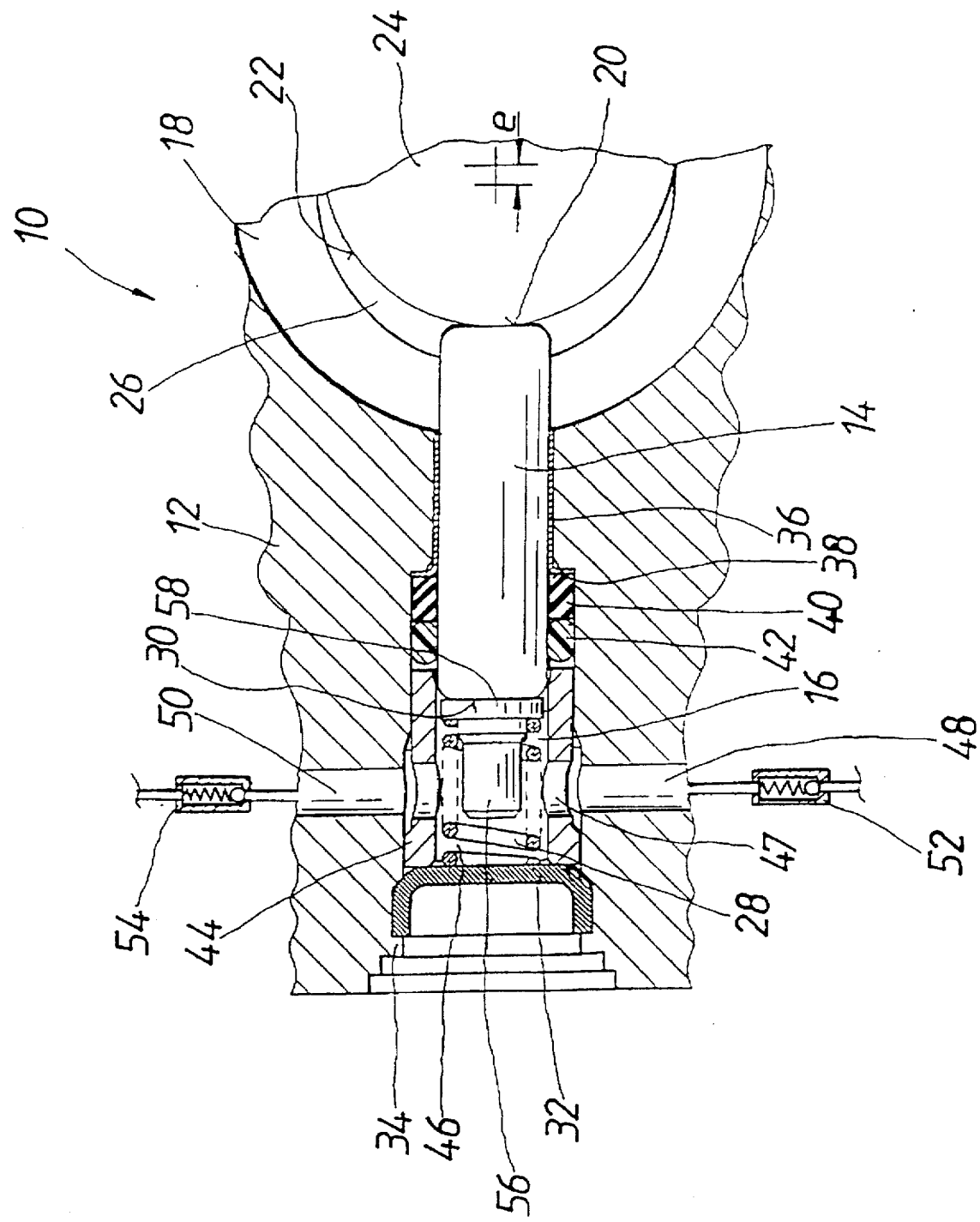

5,746,111

PISTON PUMP IN A BRAKE SYSTEM

PRIOR ART

The invention relates to a piston pump which is intended as a return pump for a hydraulic unit of an anti-lock brake system and/or as a feed pump of a traction control system for motor vehicles.

Such a piston pump is known from German Patent Disclosure DE 41 33 391 A1. In the known piston pump, the relative motion between the piston and cylinder can cause running scratches, that is, roughened places or scoring, to develop on the circumference of a piston or a cylinder bore during use of the piston pump. These scratches can damage a ring seal that seals off the piston from the cylinder, if they come into contact with the piston in its reciprocating motion.

ADVANTAGES OF THE INVENTION

In the piston pump of the invention, the piston is axially guided in the cylinder bore outside the region that comes into contact with the ring seal during piston reciprocation. In the region in which the ring seal comes into contact with the piston circumference or the cylinder bore, the piston and cylinder bore, or a filler piece inserted into the cylinder bore, do not touch one another. A sealing face on the piston or cylinder, along which the ring seal slides during the reciprocation of the piston, is separate from a piston guide. This prevents the possibility of scratches developing in a region that comes into contact with the ring seal. This is true regardless of whether the ring seal moves along with the piston, or is inserted in stationary fashion in the cylinder bore.

The invention has the advantage that the ring seal, during the reciprocation of the piston, always slides along only a sliding and sealing face that the ring seal sweeps over; consequently this face maintains its original, low-friction machined state during the entire service life of the piston pump. The ring seal is not significantly worn down and is not damaged; good sealing between the piston and the cylinder bore is assured for a virtually unlimited time.

The invention relate to further aspects and advantageous features of the piston pump of the invention.

BRIEF DESCRIPTION OF THE DRAWING

The invention is described below in further detail in terms of an exemplary embodiment shown in the drawing. The sole FIGURE of the drawing shows a longitudinal section through a piston pump of the invention.

The piston pump 10 according to the invention, shown in the drawing, is accommodated in a hydraulic block 12, which is provided for hydraulic control of an anti-lock system and a traction control system of a motor vehicle brake system. The only portion of the hydraulic block 12 shown is the region that receives the piston pump 10. It forms a cylinder bore 16 for the piston pump 10 of the invention.

A piston 14 is guided displaceably in a longitudinal direction in the cylinder bore 16. In the exemplary embodiment shown, a roller of a needle bearing, which is hardened, ground and polished, is used as the piston 14. This piston 14 is quite economical, since it is a mass-produced part. Because of its surface quality, it assures a low-friction, very good sealing cylindrical face.

One end of the piston 14 protrudes into an eccentric tang chamber 18 in the hydraulic block 12, where with one end face 20 the face end meets a circumferential face 22 of an eccentric tang 24, which is seated integrally, with an eccentricity, on a face end of an eccentric tang shaft 26, which is disposed at right angles to the piston 14 and is supported rotatably in the hydraulic block 12. By driving the eccentric tang shaft 26 to rotate, by means of an electric motor not visible in the drawing, the piston 14 can be driven via the eccentric tang 24 to reciprocate in the cylinder bore 16.

A helical compression spring 28, as the piston restoring spring, engages an end face 30 of the piston 14 remote from the eccentric tang 24 and keeps the piston in contact with the circumferential face 22 of the eccentric tang 24. The piston restoring spring 28 is braced against a closure cap 32, which is inserted into a mouth of the cylinder bore 16, on a side remote from the eccentric tang 24, and closes the cylinder bore 16. The closure cap 32 which is held in place by a shoulder 34 of the hydraulic block 12.

As long as the pressure of a fluid flowing to the piston pump 10 according to the invention suffices to fill the pump and restore the piston 14, the piston restoring spring 28 may be dispensed with. For a self-aspirating piston pump 10, the restoring spring 28 is necessary. The restoring spring has the further advantage that it keeps the piston 14 in contact with the eccentric tang 24, thus averting flapping noises that could otherwise occur if the piston 14 were to strike against the eccentric tang 24.

The piston 14 may be supported directly in the hydraulic block 12 that forms the pump cylinder. In the exemplary embodiment shown, a guide sheath 36 is press-fitted into the cylinder bore 16 adjoining the eccentric chamber 18. This sheath is made of a slide bearing material. This, together with the hardened, ground and polished piston 14, lessens the friction and wear on the guide sheath 36 and thus assures a long service life of the piston pump 10 of the invention.

After a bearing and guide segment, in which the guide sheath 36 is located and which is somewhat shorter than one-half of the piston, the cylinder bore 16 widens at an annular shoulder 38, on a side remote from the eccentric tang chamber 18. Adjoining the annular shoulder 38, a plastic support ring 40, and adjoining it a ring seal 42, surrounding the piston 14, are inserted into the widened space in the cylinder bore 16. The ring seal 42 is an elastomer O-ring.

The width of the support ring 40, or in other words its length in the axial direction of the piston 14, is slightly greater than the length of one stroke of the piston 14, which is equivalent to twice the eccentricity e. In this way, the possibility that the ring seal 42 can come into contact with scratches on the piston 14, which can occur from its reciprocation in the region in which the piston 14 is guided in the cylinder bore 16, is averted. Scratches are roughened places or scoring resulting from the relative motion between the piston 14 and the cylinder 12. As a result, a circumferential face of the piston 14 in a region (sealing face) swept by the ring seal 42 permanently remains as smooth as it was when manufactured. By means of the ground, polished piston, the result is a low-friction, low-wear, durable seal between the piston 14 and the cylinder 12.

Between the ring seal 42 and the closure cap 32, a hollow-cylindrical plastic filler piece 44 is inserted into the cylinder bore 16, whose inside diameter has some play relative to the piston diameter. This filler piece 44 shrinks any idle volume and thereby improves the efficiency of the piston pump 10 according to the invention. A positive-displacement chamber 46 of the piston pump 10 is located in the interior of the plastic filler piece 44. Moreover, a groove for the ring seal 42 is formed in a simple way between the plastic filler piece 44 and the support ring 40. The cylinder bore 16, having essentially only one annular shoulder 38, is easy to manufacture, and installing the ring seal 42 takes minimal effort; it is thrust into the cylinder bore 16 together with the support ring 40 and the plastic filler piece 44.

The plastic filler piece 44 is provided with a continuous transverse bore 47, which communicates with an inlet bore 48 and an outlet bore 50 of the hydraulic block 12, which discharge into the cylinder bore 16 between the closure cap 32 and the end face 30, toward the closure cap, of the piston 14. One one-way check valve each is inserted into the inlet bore 48 and the outlet bore 50 and acts as an inlet valve 52 and an outlet valve 54, respectively.

A cylindrical positive-displacement body 56 is disposed in the piston restoring spring 28 embodied as a helical compression spring; it further decreases the volume of the positive-displacement chamber 46 and at the same time the idle volume, and thus further increases the efficiency of the piston pump 10 of the invention. This positive-displacement body 56 has a flange 58 placed between the piston restoring spring 28 and the piston 14. The piston restoring spring 28 presses the flange 58 of the positive-displacement body 56 against the end face 30, toward it, of the piston 14, and via the flange 48, it presses the piston 14 against the circumferential face of the eccentric tang 24. The positive-displacement body 56 is short enough that it does not strike the closure cap 32 during the reciprocation of the piston 14. Instead of being mounted on the piston 14, it may be mounted on the closure cap 32. The positive-displacement body 56 also acts as a protection against kinking for the piston restoring spring 28.

The cylinder bore 16, if no guide sheath 36 is press-fitted into it, is abraded in its guide region for the piston 14, to achieve low-friction and low-wear bearing and guidance of the piston. The support ring 40 may either be slit at some point on its circumference, or it may be embodied as continuous as in the exemplary embodiment shown.

The foregoing relates to preferred exemplary embodiments of the invention, it being understood that other variants and embodiments thereof are possible within the spirit and scope of the invention, the latter being defined by the appended claims.

We claim:

1. A piston pump comprising a piston (14), said piston (14) having a constant diameter over its length and being reciprocatable in a cylinder (16), an excentric tang (24) that rotates in an eccentric tang chamber (18) for driving said piston (14), said cylinder (16) includes a first narrow region which adjoins said eccentric tang chamber (18) which guides said piston (14), said cylinder (16) includes a second wider region and an annular shoulder (38) between said first narrow region and said second wider region of said cylinder (16), and a ring seal (42) placed inside said second wider region of said cylinder having a sealing contact with said piston (14), wherein said ring seal (42) is spaced apart from said annular shoulder (38) by at least a length of a piston stroke.

2. The piston pump of claim 1, in which on one side of the ring seal (42), the piston has a support ring (40), and a width of said support ring is greater than the length of a piston stroke.

3. The piston pump of claim 1, which includes a filler piece (44), said filler piece is inserted into a positive-displacement chamber (46) that is a part of the cylinder bore (16), and which forms an annular groove end face of an encompassing groove for the ring seal (42).

4. The piston pump of claim 2, which includes a filler piece (44), said filler piece is inserted into a positive-displacement chamber (46) that is a part of the cylinder bore (16), and which forms an annular groove end face of an encompassing groove for the ring seal (42).

5. The piston pump of claim 1, in which a piston restoring spring (28), is disposed in a positive-displacement chamber (46), and a positive-displacement body (56) is disposed relative to an end face of the piston relative to a restoring spring (28).

6. The piston pump of claim 2, in which a piston restoring spring (28), is disposed in a positive-displacement chamber (46), and a positive-displacement body (56) is disposed relative to an end face of the piston relative to a restoring spring (28).

7. The piston pump of claim 3, in which a piston restoring spring (28), is disposed in the positive-displacement chamber (46), and a positive-displacement body (56) is disposed relative to an end face of the piston relative to a restoring spring (28).

8. The piston pump of claim 1, in which a guide sheath (36) for the piston (14) is inserted into the cylinder bore (16) outside a region within which the piston (14) is radially spaced apart from the cylinder bore (16).

9. The piston pump of claim 2, in which a guide sheath (36) for the piston (14) is inserted into the cylinder bore (16) outside a region within which the piston (14) is radially spaced apart from the cylinder bore (16).

10. The piston pump of claim 3, in which a guide sheath (36) for the piston (14) is inserted into the cylinder bore (16) outside a region within which the piston (14) is radially spaced apart from the cylinder bore (16).

11. The piston pump of claim 4, in which a guide sheath (36) for the piston (14) is inserted into the cylinder bore (16) outside a region within which the piston (14) is radially spaced apart from the cylinder bore (16).

12. The piston pump of claim 1, in which the piston is formed by a roller of a needle bearing.

13. The piston pump of claim 2, in which the piston is formed by a roller of a needle bearing.

14. The piston pump of claim 3, in which the piston is formed by a roller of a needle bearing.

15. The piston pump of claim 4, in which the piston is formed by a roller of a needle bearing.

16. The piston pump of claim 5, in which the piston is formed by a roller of a needle bearing.

* * * * *